United States Patent
Sawtell et al.

(10) Patent No.: US 7,345,894 B2
(45) Date of Patent: Mar. 18, 2008

(54) CASCODE SWITCH POWER SUPPLY (75) Inventors: Carl K. Sawtell, San Jose, CA (US); Paolo Menegoli, San Jose, CA (US)

(73) Assignee: Carl Sawtell, San Jose, CA (US)

( * ) Notice: Subject to any disclaimer, the term of this patent is extended or adjusted under 35 U.S.C. 154(b) by 0 days.

(21) Appl. No.: 11/516,484

(22) Filed: Sep. 7, 2006

(65) Prior Publication Data
US 2007/0070659 A1   Mar. 29, 2007

Related U.S. Application Data
(60) Provisional application No. 60/720,617, filed on Sep. 27, 2005.

(51) Int. Cl.
*H02M 3/335* (2006.01)
*G05F 1/46* (2006.01)

(52) U.S. Cl. ............... 363/21.11; 363/21.07; 363/21.15; 363/21.18

(58) Field of Classification Search ......... 363/16, 363/20, 21.01, 21.04, 21.07, 21.08, 21.1, 363/21.11, 21.12, 21.18, 97, 131; 323/224, 323/282, 351
See application file for complete search history.

(56) References Cited

U.S. PATENT DOCUMENTS
| | | | |
|---|---|---|---|
| 6,233,165 B1 | 5/2001 | Irissou | |
| 6,483,369 B1 | 11/2002 | Wittenbreder | |
| 6,643,144 B2 * | 11/2003 | Feldtkeller | 363/16 |
| 6,775,164 B2 | 8/2004 | Wong | |

* cited by examiner

Primary Examiner—Gary L. Laxton (57) ABSTRACT

A switching power supply is disclosed for improving the no-load power drain of low-power mains operated supplies. The power converter utilizes a cascoded switch arrangement with a conventional high voltage power MOSFET and a low voltage, low gate charge MOSFET. Driving only the small low voltage device reduces the power required for gate drive. The disclosed configuration is also capable of generating a non-isolated auxiliary rail for powering its control circuitry utilizing the parasitic capacitance of the high voltage power devices as an element in a charge pump. The resulting power supply requires significantly fewer components.

9 Claims, 7 Drawing Sheets

CASCODE SWITCH POWER SUPPLY

CROSS REFERENCE TO RELATED APPLICATION

This application claims the benefit of prior U.S. Provisional Application Ser. No. 60-720,617 filed Sep. 27, 2005 titled "LOW POWER LOSS OFFLINE POWER CONVERSION."

BACKGROUND OF THE INVENTION

1. Field of the invention

The present invention is in the field of electronic circuits. The present invention is further in the field of analog integrated circuits and switching semiconductor circuits.

The invention also falls within the field of switching power converters that convert one DC level to another or convert AC power to DC power.

2. Brief Description of Related Art

The desire to lower overall energy and the proliferation of small low power and mobile devices has created new requirements of offline power supplies. Consumer electronics are often supplied with no internal power supply, and instead are powered by an external "wall wart", a small power supply typically built directly into the AC mains plug. Traditionally made from mains frequency (50/60 Hz) transformers, these supplies draw some power from the mains so long as they are plugged in, even when supplying no power to their load. Considering the number of these devices in use, and the fact that they are rarely if ever unplugged from the mains, a considerable amount of energy is wasted. New governmental regulations begin to require that these systems be made with extremely low non-operating power. The economics of improving these transformers is such that a switching power supply solution becomes a cost effective alternative.

The use of switched power conversion allows for active elements to be used as low-loss switches, having either no current through the switching element in its "off" state or high current but low voltage across the switch in its "on" state. In combination with reactive elements (inductors, capacitors), the switches form networks which repeatedly draw energy from the input and deliver it to an output with high conversion efficiency. Typical of topologies used in switching power converters are forward, flyback, boost and buck converters, all well known in the art.

The efficiency of a converter in operation is not as critical in this application as reducing the fixed amount of power that may be drawn by the power supply when no power needs to be delivered. This system requirement suggests the need for new solutions for powering the control circuitry and managing the no-load condition.

Figure 1:
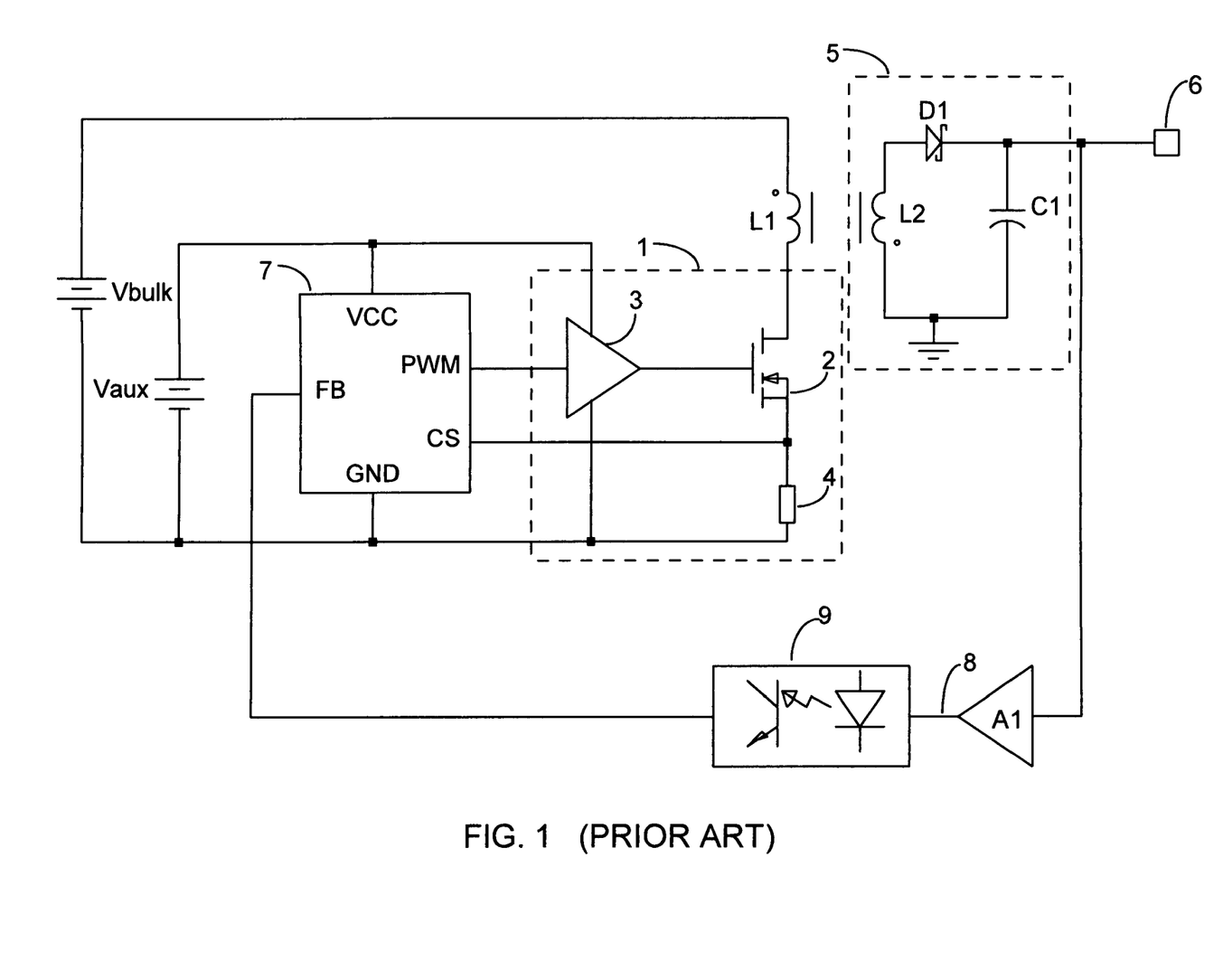
FIG. 1 shows a prior art generic switching power supply

Switching power supplies operated from mains input typically require a low-voltage control circuit, either an integrated circuit or a small collection of transistors, that can alternately turn on and off a power device in response to the magnitude of the required output voltage and current. This operation is controlled by a feedback system, where the output voltage is measured and compared to some reference. Additionally, some control loops also measure quantities such as the instantaneous current in the power switching device to improve the dynamics of the control loop. A typical prior art power supply configuration is shown in FIG. 1.

The power stage 1 in a switching power supply converter typically has three key elements: a switch 2, typically a power MOSFET; a gate drive circuit 3 to turn the switch on and off; and a current sensing element 4, often a resistor. The switch is in series with the key inductive element L1 of the converter, which may be either an inductor or one winding of a transformer. The inductive element is connected to the positive voltage Vbulk, which is the rectified mains voltage.

When the power stage is repetitively turned on and off, energy is coupled inductively to an output network 5, with coupled inductor L2 shown here as it would be in a flyback converter. The voltage across L2 is rectified by diode D1 which charges output capacitor C1 to a substantially constant DC voltage. The voltage across C1 is presented to the output terminal 6.

Additionally, a control circuit 7 includes a number of low level control circuits. These circuits require a source of power, Vaux, to terminal VCC, a feedback signal at terminal FB, and typically a signal representative of the instantaneous current in the switch and inductor at terminal CS. The control signal processes the feedback and current sense information in well-known ways to create a pulse modulated high frequency signal at terminal PWM that is then applied to the gate drive circuit 3. A generalized source of power Vaux, to be described below, supplies the power required both by the control circuits 7 and the gate drive 3.

The feedback signal is typically generated by an error amplifier A1 connected to the output, creating a signal 8 that is typically the integral of the difference between the output voltage and the desired voltage. In a mains powered system, the output is typically galvanically isolated from the input, so direct electrical connection between this error signal 8 and the main control circuit 7 is to be avoided. This error signal 8 is coupled back to the control circuitry 7 by an isolating means 9, typically an optocoupler.

The transformation of switching energy in inductive element L1 and an associated rectifying and filtering stage 5 are well known in the art. Forward, flyback, boost and buck-boost topologies, among others, are implemented with minor variations in the connection of the transformer, inductors, capacitors and diodes shown, which is generalized in the form of a flyback converter.

Although omitted from FIG. 1 and subsequent figures, there is typically a "snubber" or "reset" circuit used to control the voltage across inductor L1 and hence switch 2. This is well known in the art and necessary as the coupling between inductors L1 and L2 is imperfect, and some inductive energy in L1 must be recirculated or dissipated while switch 2 is off.

Figure 2:
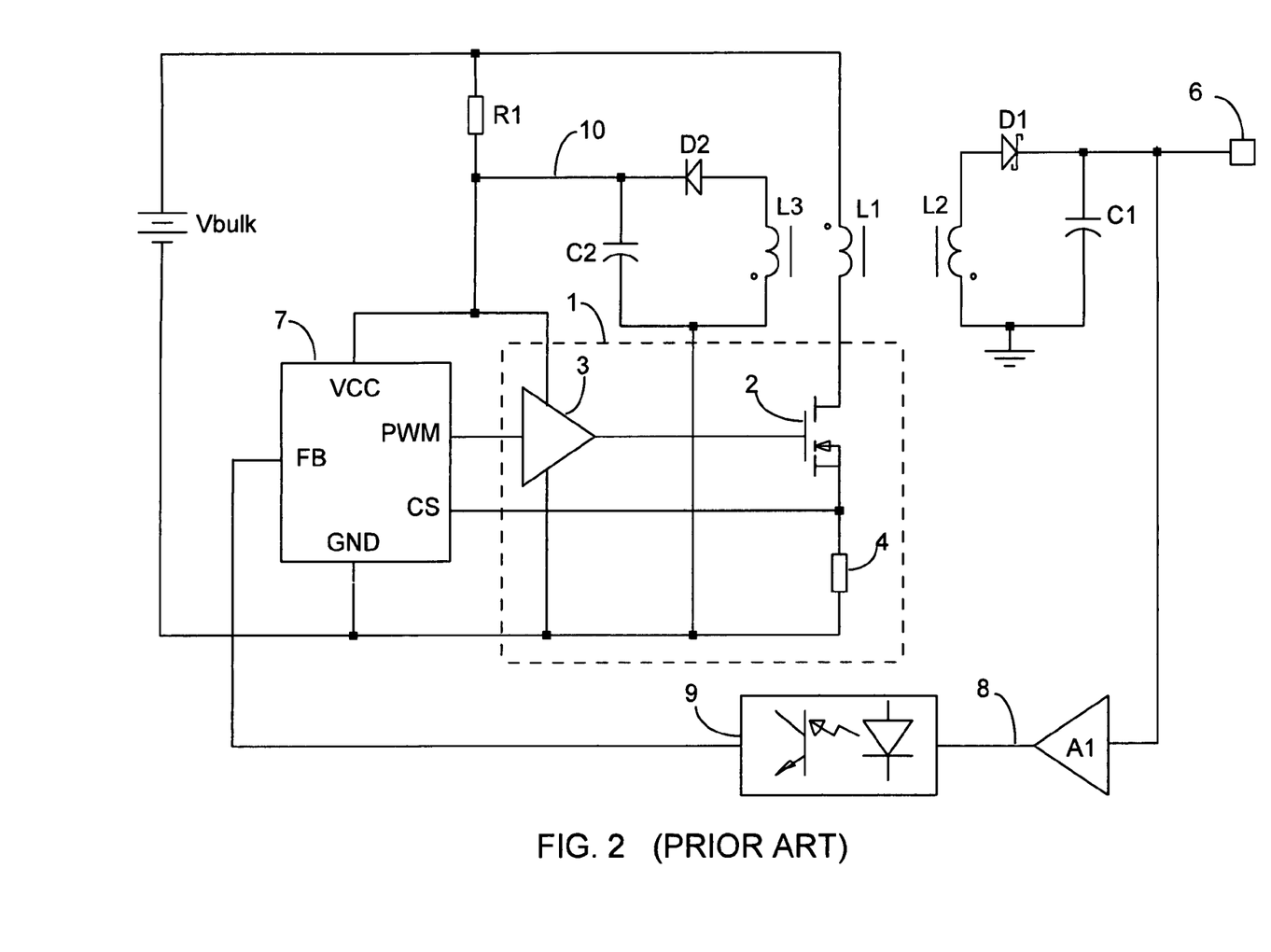
FIG. 2 shows a prior art generic power supply with a bootstrapped auxiliary rail

Problematic for the efficient operation of the power supply is the voltage source Vaux in FIG. 1. As shown in FIG. 2, this is often implemented as an independent output of the switching power supply. A small power supply output 10 effectively replaces Vaux of FIG. 1. A third coupled inductive element 13, in combination with diode D2 and reservoir capacitor C2, generates an auxiliary supply voltage 10 in a manner similar to the generation of the output voltage at 6. In this way the low voltage auxiliary supply 10, typically in the range of 5-20V, can be established with high efficiency. The supply must have a means of "bootstrapping": the continuous power to run the control circuitry is available only once the switching power supply is running, so an alternate source of power is required to start the control circuit. A typical scheme is shown in FIG. 2, a high value resistor R1 can charge C2 up to a reasonable working voltage. R1 is chosen to be a high resistance such that it will have minimal power dissipation.

The proper operation of the bootstrapping of FIG. 2 requires that the control circuitry 7 implements a function commonly called "undervoltage lockout". A circuit internal to the control circuit 7 monitors the voltage at pin VCC and holds the control circuitry in a low current non-operating state until VCC reaches some upper threshold, such as 14V. The control circuit then enters an operating state which will begin the normal switching action. The operating current in this mode will be significantly larger than the current supplied by R1. The voltage on the reservoir capacitor C2 will therefore drop. A second lower threshold, e.g. 8V, exists such that if the voltage 10 at the VCC terminal of the control circuit drops below this second threshold, the control circuit will again enter its low-power non-operating state. If, however reservoir capacitor C2 is appropriately sized, it will provide enough energy for the switching converter to regulate the output voltage 6 to its desired level and the voltage at 10 to a level above the lower threshold, thus keeping the converter in its normal operating mode.

Another aspect of operating at low power is that efficiency is often improved by operating at lower frequency. Some modulation schemes directly control frequency, but even modulators with fixed oscillators can be driven to effectively lower frequency in standard prior art schemes. This is often referred to as "pulse skipping" as it entails creating pulses that are controlled by the normal clock signal, but many clock cycles may have no output pulses. This gives an effectively lower frequency.

Another scheme used for lowering dissipation at low power is a so called "burst mode". In the case of offline converters, this is usually accomplished via the combined effects of an undervoltage lockout, a frequency modulated pulse stream, and a designed-in limitation on the bootstrap circuitry, as in the system described in FIG. 2. If the converter operates at low output power, the effective switching frequency drops as described above. The output capacitor C1 may be made relatively large, and the reservoir capacitor C2 relatively small, such that the effective droop on the output remains small with only occasional output pulses, but that same low pulse frequency allows significant droop on C2. The resultant voltage is insufficient to maintain the VCC terminal of the control circuit above its lower undervoltage lockout threshold. The control circuit will enter the inactive mode and no further switching will occur until the high value resistor R1 again charges C2 back to the upper threshold. This leads to alternate periods of the converter operating at very low duty cycle and frequency to keep the output 6 charged and periods of non-operation.

One difficulty of implementing the burst mode operation with the scheme shown in FIG. 2 is that the auxiliary power rail 10 and the output voltage at terminal 6 are cross-regulated, that is, the two voltages are both based upon the peak voltages across two coupled winding. To generate the desired burst mode such that the output remains relatively well regulated while the control circuit cycles through its undervoltage lockout states, it is desirable to make the output capacitor C1 sufficiently large that it does not droop significantly under minimal loading during the period of a single "burst" of the undervoltage lockout. The reservoir capacitor C2 is scaled such that with the known current drain of the control chip, the time to discharge from the upper threshold to the lower threshold of the undervoltage lockout is sufficient to allow the power supply to start up (bootstrap), and the resistor R1 is scaled to recharge C2 in a reasonable time. Upon restarting, it is desired that the output can be driven to or beyond its nominal regulation point within a few switching cycles, insuring that the overall regulation loop will quickly inhibit further switching.

The control circuits 7 is often implemented in a silicon integrated circuit, which may also include the gate drive 3 or the whole of power stage 1. A very typical integrated circuit for this use is the UC3842, produced by Texas Instruments, among others. This chip includes the active control circuits 7 and the gate drive stage 3, but requires the switch 2 and current sense element 4 to be external. In normal operation, the UC3842 additionally requires discrete external elements to set the frequency of oscillation and to act as stabilizing compensation for the overall control loop.

A limiting factor in reducing the current consumption is the current needed for driving the gate of switch 2. Typically switch 2 is a high voltage MOSFET. The construction of high voltage devices requires a significant increase in size compared to similar low voltage devices. One important figure of merit for a MOSFET switch is its Rds(on), the resistance from drain to source when the device is fully turned on. A second important metric is the gate charge Qg, which is a measure of the total charge needed to charge the gate-source and gate-drain capacitances from the off state to the on state. For a constant Rds(on), higher voltage FETs must usually increase in physical size as voltage ratings go up, typically as the square of the required voltage. The gate charge, which is a function of the overall capacitance of the gate similarly increases.

In comparing a high voltage device such as would be used in switching power supplies requiring greater than 500V breakdown and low voltage integrated circuit MOSFET, one can expect similarly resistive switches to differ in size by four or five orders of magnitude, and their capacitance to scale by more than two orders of magnitude. A 1 Ohm 600V FET may require 40 nC of charge to switch fully, whereas a 5V MOSFET with the same resistance will typically require about 50 pC, nearly 1000 times less charge.

In the gate drive scheme typical of controllers like the UC3842, the current to charge the gate, Qg, of switch 2 is drawn from the auxiliary supply 10. As switch 2 is turned off, that charge is then shunted to ground. Since that charge Qg is drawn from the supply terminal every cycle, the effective current required to switch the MOSFET is Qg times the switching frequency. As an example, the typical 600 Volt, 1 Ohm MOSFET above, with a gate charge of 40 nC would require 8 mA to switch at 200 kHz.

One object of the present invention is to eliminate the DC current associated with charging and discharging the gate of the high voltage power MOSFET in a switching converter. To this end, a cascode connection of low voltage transistors and high voltage transistors will be used to recirculate the gate charge in the high voltage MOSFET rather than charging and discharging the gate in a dissipative manner.

Figure 3:
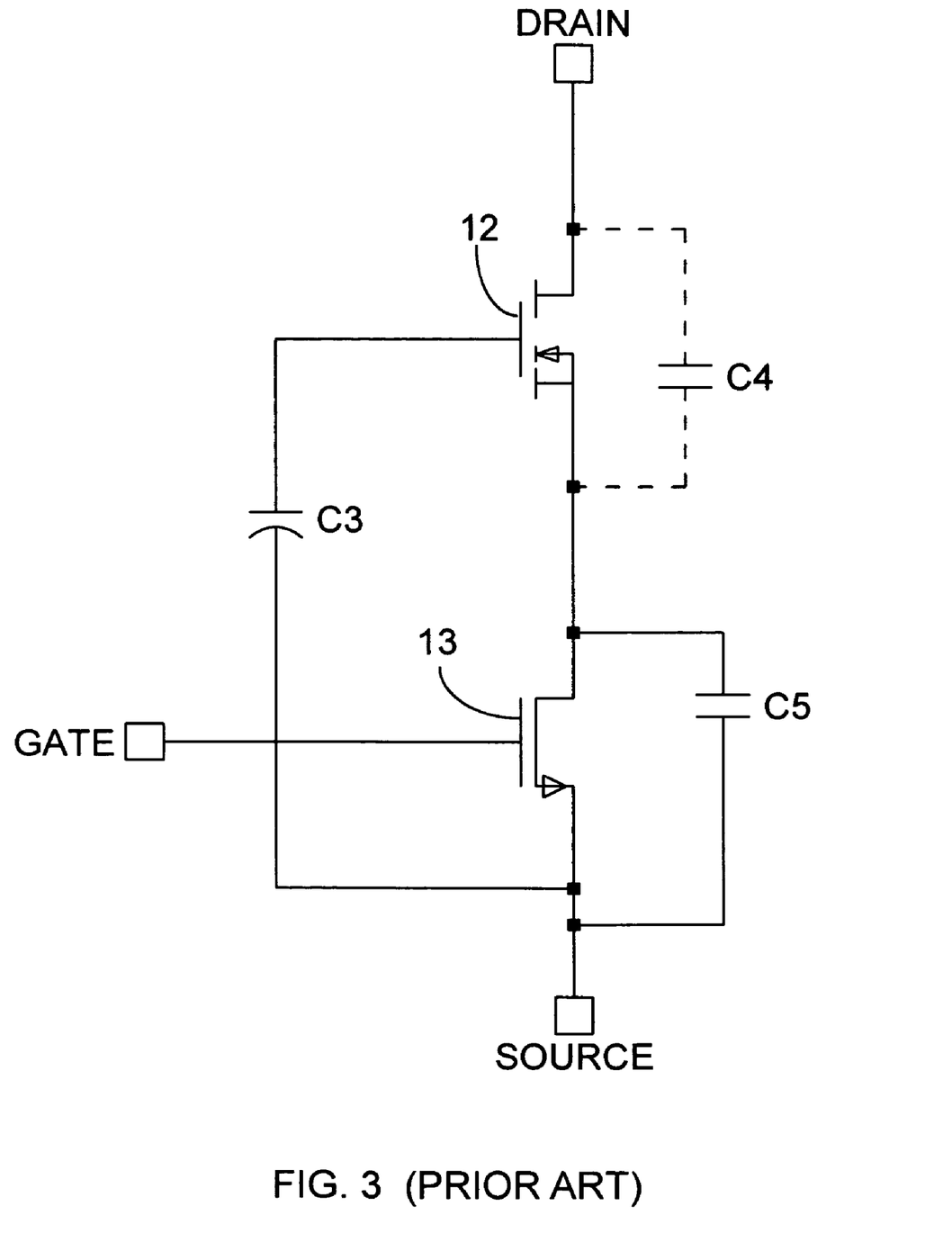
FIG. 3 shows the prior art cascode switch connection of Wittenbreder

Wittenbreder (U.S. Pat. No. 6,483,369) teaches the advantage that can be obtained by replacing the MOSFET switch of FIG. 1 with a composite device as shown in FIG. 3. A low voltage MOSFET 13, typically a device made with a VLSI integrated circuit process with very low gate charge is driven by a PWM control signal. The gate and source of MOSFET 13 become the effective gate and source of the compound element, whereas the drain of this element is the drain of high voltage MOSFET 12, which is placed in series, or as more typically described, MOSFET 12 cascodes MOSFET 13. The gate of MOSFET 12 is connected to a bypass capacitor C3 that is charged to a voltage appropriate to provide a fully enhanced Vgs for MOSFET 12 when on. The means of charging C3 to such a voltage is not shown but would be clear to those skilled in the art.

The dissipation caused by driving the gate of the low voltage FET 13 of FIG. 3 is very low, and the AC gate current of the high voltage FET is transferred to and from a reservoir capacitor C3 with effectively no loss. The net DC current into the gate of MOSFET 12 is zero, so placing the variation on the voltage across C3 is set by the total gate charge transferred back and forth between MOSFET 12 and capacitor C3 as MOSFET 13 is alternately turned on and off.

Wittenbreder also teaches that the drain-to-source capacitance C4 of high voltage MOSFET 12 can cause problems in this configuration. As the low voltage MOSFET 13 turns off, the current through MOSFET 12 quickly charges the common node between the FETs such that the Vgs of MOSFET 12 will be close to threshold, effectively turning MOSFET 12 off. The drain voltage on MOSFET 12 may then see a transition of several hundred volts. Even if the effective value use of capacitor C4 is low, the resultant coupling may drive the drain of low voltage MOSFET 13 to a relatively high voltage. This "charge pump" effect, as taught by Wittenbreder, is to be suppressed to prevent damage to MOSFET 13. Capacitor C5 across the drain and source of MOSFET 13 is taught as a means to absorb this charge, though it causes some additional dissipation in MOSFETs 12 and 13.

Figure 4:
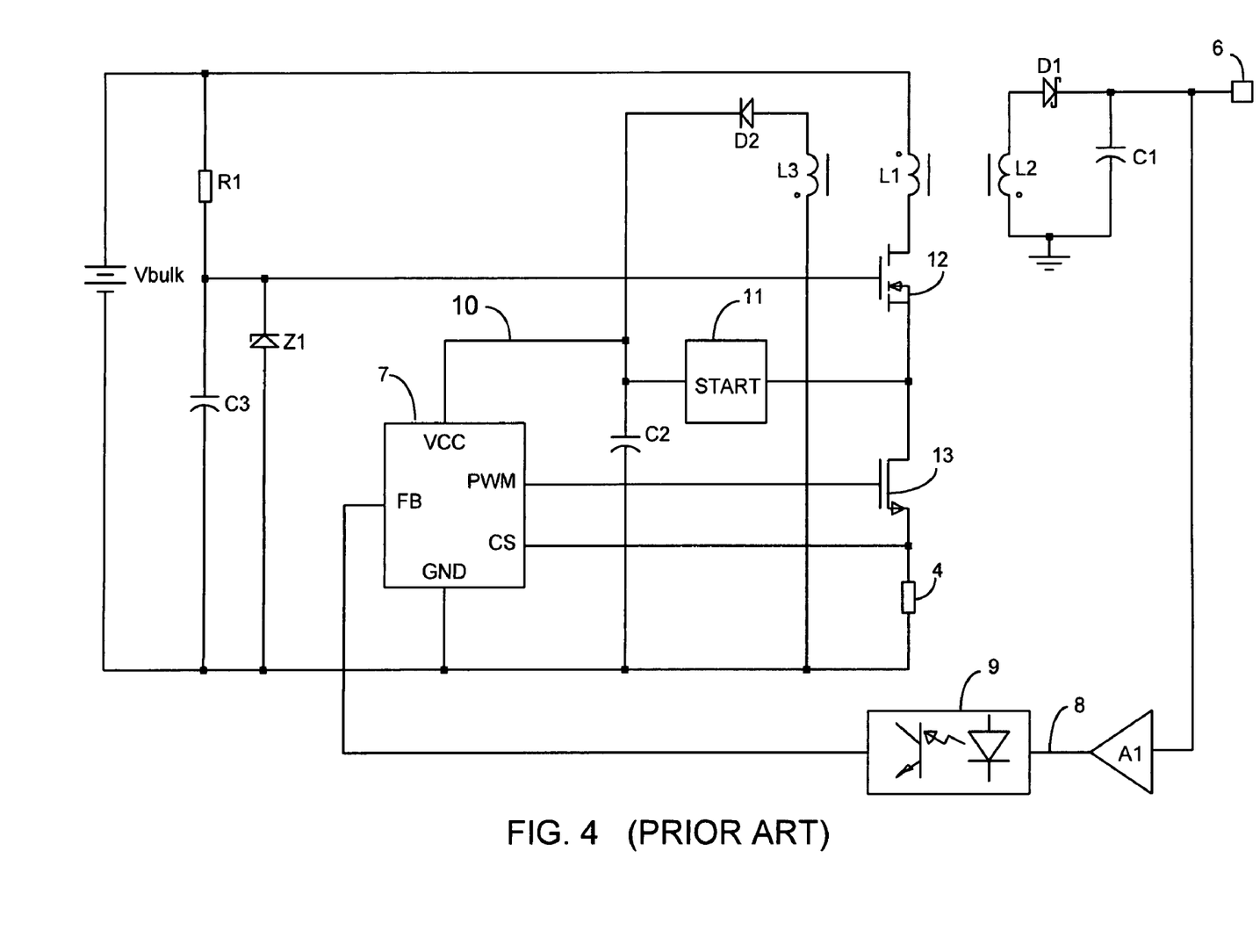
FIG. 4 shows the prior art cascode power supply of Wong et al.

Such use of cascoded devices is well known, though not often applied to switching power circuits. Wong et al. (U.S. Pat. No. 6,775,164 B2) generate a low voltage integrated circuit with a low voltage, high current FET and sense resistor in the integrated circuit, and use an external MOSFET to hold off the high voltage of an off-line power supply. This scheme is illustrated in FIG. 4. Compared to earlier FIG. 2, the main switch 2 has been replaced with series MOSFETs 12 and 13, and a simple bias supply has been generated for the gate of MOSFET 12. This bias consists of a high value resistor R1 feeding a gate decoupling capacitor C3 at the gate of MOSFET 12, as per Wittenbreder. A zener clamp Z1 sets the maximum voltage to which gate decoupling capacitor C3 may be charged. The control circuitry is powered by auxiliary power supply output 10 as in FIG. 2, though Wong also discloses combining the chip power and feedback functions. Of particular interest is the bootstrapping for initial startup, achieved by drawing current directly through MOSFET 12 by a startup bias generator 11.

While the circuit of FIG. 4 is in a non-switching state, MOSFET 12 can be viewed as a source follower, with the voltage at the source of MOSFET 12 being maintained at a level approximately one threshold voltage below the voltage at its gate, which will be a voltage which ramps from zero to substantially the breakdown voltage of zener Z1. The start circuitry 11 need be only a switch which connects this controlled DC level to C2, where it serves as temporarily as the auxiliary power supply. Once the VCC terminal of control circuit 7 reaches its upper undervoltage lockout threshold, the start circuit 11 is disabled and switching begins, maintaining auxiliary power supply rail 10 via the action of L3 and D2 as in FIG. 2.

Figure 5:
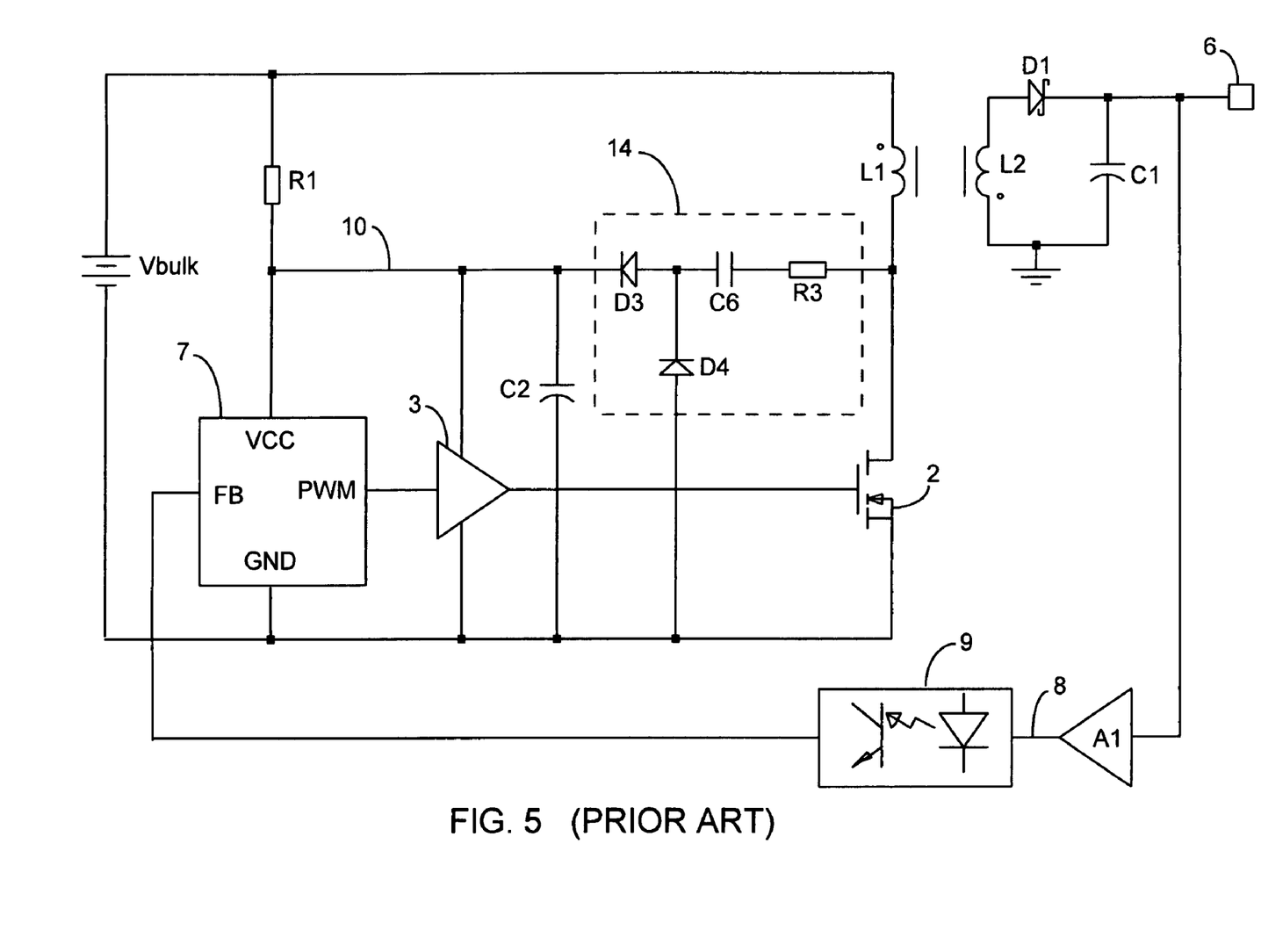
FIG. 5 shows the prior art charge pump scheme of Irissou et al.

Another alternative scheme to generate the low voltage auxiliary supply for running the control circuit has been disclosed by Irissou et al. (U.S. Pat. No. 6,233,165). This scheme is shown in FIG. 5, with the general configuration and operation of the power supply as shown in FIG. 1, but the auxiliary supply 10 is now generated by a charge pump 14. The charge pump consists of capacitor C6, resistor R3 and diodes D3 and D4. When switch 2 is on, all of these components will be at low voltage. As switch 2 is turned off and the voltage at its drain it becomes large, capacitor C6 is charged to high voltage, and the current through it flows out D2 and into reservoir capacitor C3. Resistor R3 slows the charging, with a time constant generally considerably less than one switching cycle, but sufficient to suppress high Q resonances between the transformer winding L1 and the series capacitors C3 and C6. The resulting charge across C5 is then discharged through resistor R3 and diode D3 when switch 2 again turns on. Resistor R1 is still required to bootstrap the power supply at startup, but the power for the control circuitry can be generated without the need for a dedicated winding on the transformer.

Also well known in the art are alternative methods of generating the feedback signal for control circuit 7.

SUMMARY OF THE INVENTION

It is an object of this invention to produce a circuit which switches a power MOSFET with a minimum of required power. It is a further object of this invention to provide a means to significantly reduce power loss under the condition of no load at the power supply output.

It is a further object of this invention to provide a scheme for generating an efficient low voltage source of power for the control chip of a power supply control circuit, and to do so with a minimum of components and cost.

According to the embodiments of this invention, a switching means comprises the series connection of a high voltage power MOSFET in a common gate configuration and a low voltage transistor. The low voltage transistor is ideally implemented on an integrated circuit along with other control elements. The source terminal of the high voltage MOSFET is clamped to the gate voltage by a diode both to prevent this node from going to high voltage and to provide a path for dumping capacitive energy into the auxiliary supply rail used for the control circuit. The gate of the high voltage power MOSFET and the supply voltage for the integrated circuit are connected to this substantially fixed auxiliary supply rail, and provide minimal DC current drain. Turning on and off the low voltage MOSFET requires minimal energy, and the power MOSFET requires no power for its gate drive. The low voltage transistor, when in the "on" state, can also serve as a current sense element for the control loop.

The present invention allows a mains powered switching power supply to require a significantly reduced power for the driving of a power device, and to generate the control power without need for a separate transformer winding dedicated to this purpose. The use of a common gate power MOSFET eliminates the need for a DC power source to drive the gate capacitance, and the common gate connection additionally allows for the implementation of a charge-pump conversion of switching energy to provide power for control circuitry. Because this charge pump conversion is frequency dependent, the present invention utilizes this charge pump as a means to trigger a power cycling mode to significantly reduce power at no-load conditions.

DETAILED DESCRIPTION OF SPECIFIC EMBODIMENT

Figure 6:
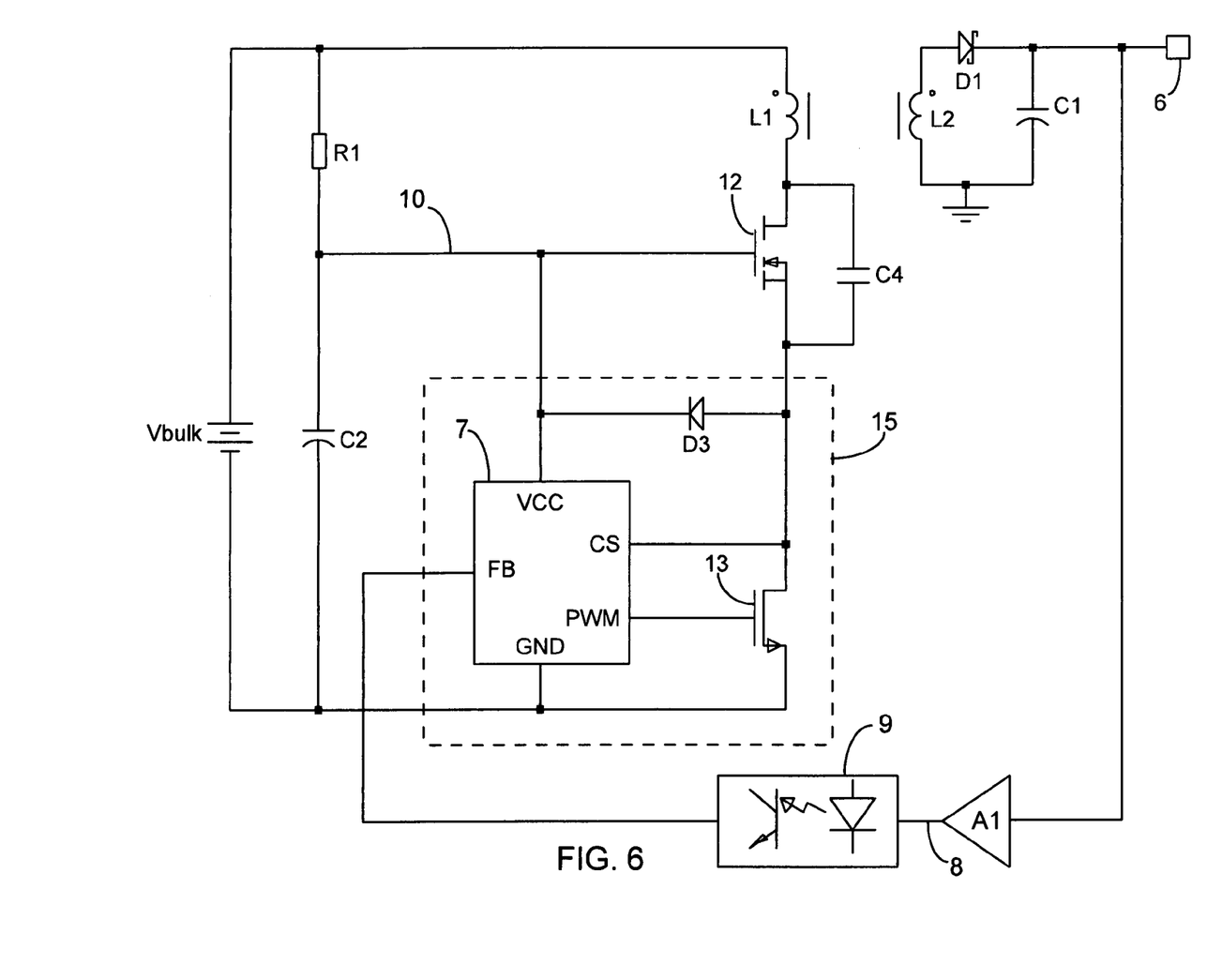
FIG. 6 shows the preferred embodiment

A preferred embodiment of the present invention is shown in FIG. 6. A bulk supply voltage, Vbulk, represents the incoming energy source, typically rectified AC mains but alternately a DC source as is generally used in telecom systems. A control circuit 7 has the conventional function of controlling a pulse modulated signal at the PWM terminal as a function of the inputs to the control circuit at the CS and FB terminals. Control circuit 7 receives its required power from a VCC terminal connected to an auxiliary power supply rail 10.

The PWM output of the control circuit 7 drives a low voltage transistor 13, which also acts as a current sense element. When MOSFET 13 is in its "on" state, it has a resistive characteristic and can be seen in this state as analogous to current sense element 4 of FIGS. 1, 2, 4 and 5. The current sense circuitry of control circuit 7 must gate the voltage at the CS input as it is a valid representation of switch current only when MOSFET 13 is fully on.

As transistor 13 is cycled on and off, high voltage MOSFET 12 is cycled on and off as a result, driving L1 with pulses of current. Inductor L2, which is magnetically coupled with L1, is used to generate the power supply output. Diode D1 rectifies the pulsating voltage across L2, and capacitor C1 filters the pulses to achieve a DC output voltage at output terminal 6. This output voltage is processed by amplifier A1 to generate an error signal 8. The error signal is coupled back to the control circuit's FB input via isolated coupler 9.

The energy to power the auxiliary power supply output 10 has two sources. At startup, a small current flows through high value R1 to establish a voltage on C2. Once the control circuit begins switching, a charge pump supplies power to maintain the voltage on auxiliary power supply output 10. This charge pump consists of capacitance C4, diode D3, and reservoir capacitor C2. Capacitance C4 is ideally the parasitic drain-source capacitance inherent in power MOSFET 12. Because parasitic capacitance C4 will charge hundreds of Volts each cycle at turn-off, the resultant charge can be routed via diode D3 to the auxiliary rail 10, keeping reservoir capacitor C2 well charged. Should a small MOSFET be chosen such that it transfers too little energy in its inherent drain-source capacitance, the magnitude of the capacitance can be increased by augmenting the capacitance with a small value discrete capacitor C4 placed externally from drain to source.

Compared to the charge pump of FIG. 4, the diode D4 is no longer needed, its function being provided by the switching action of MOSFET 13. The diode D3 of the present invention, being situated between the CS and VCC terminals of control circuit 7, is easily integrated into a control integrated circuit 15, along with low voltage MOSFET 13. C4 is ideally the inherent drain-to-source capacitance of high voltage MOSFET 12. Therefore, unlike the schemes of FIGS. 2, 4, and 5, no components in addition to the control integrated circuit 15 and external high voltage MOSFET are needed to transfer power to auxiliary supply rail 10.

In order to bootstrap effectively, the control circuitry must include an undervoltage lockout functionality, allowing the control chip to remain in an inactive state drawing negligible current until reservoir capacitor C2 becomes adequately charged. The pulse modulation scheme is allowed to vary in frequency at low power, as is usual in the art. This would allow for either variable frequency control schemes or for schemes which skip cycles when the effective duty cycle must be low. This allows the converter to enter a "burst mode". The charge pump action of C4 and D3 is inherently frequency sensitive, and as the pulse frequency drops at low power the charge pump action will be unable to keep the auxiliary supply voltage 10 above the lower undervoltage threshold. This will result in alternating periods of low power switching and periods where the control is inactive as R1 recharges reservoir capacitor C2 in order to again bootstrap the system.

It is desirable to set in control circuit 7 a minimum on-time for the PWM control signal. At light loads, where it is desirable to enter the burst mode, a minimum pulse width will force the control loop to regulate the output with fewer, longer pulses rather than a larger number of shorter pulses. Because the charge pump action which keeps auxiliary rail 10 charged is sensitive to the frequency of the switching, increasing the minimum pulse width reduces the ability of the charge pump to maintain the voltage at the VCC terminal of control circuit 7 within its normal operating range. Controlling the minimum pulsewidth therefore provides a means to control the output power below which the system enters burst mode.

Figure 7:
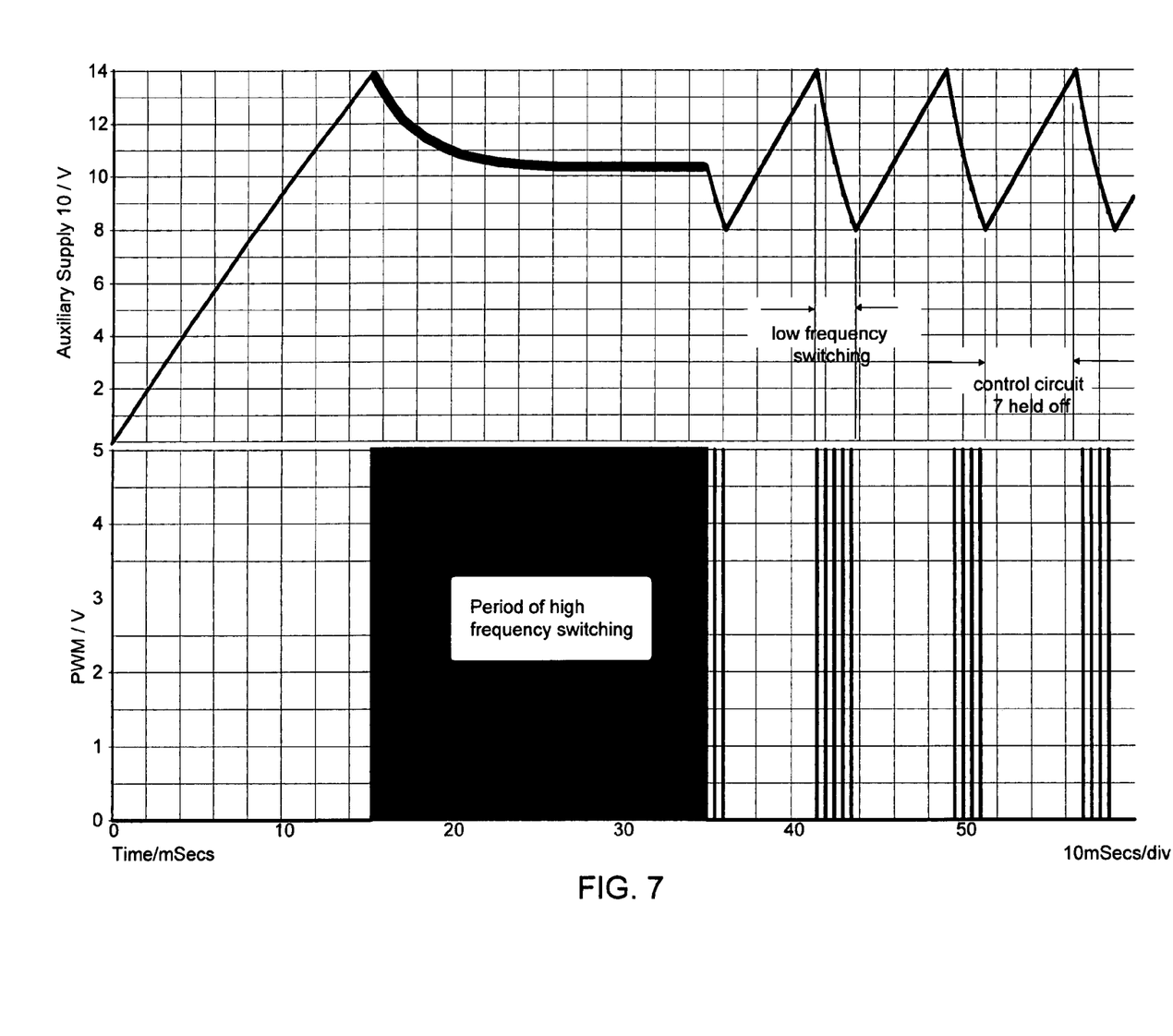
FIG. 7 shows the timing relationships of controller supply voltage and the PWM signal

The combination of the "burst mode" operation that alternately cycles the control circuitry on and off, a low effective switching frequency at low power, and the use of a frequency dependent charge-pump to power the control circuit allows for extremely low average power under no-load conditions. This is illustrated in FIG. 7, to be explained with reference to the elements of FIG. 6. The upper plot is the auxiliary supply voltage 10. The lower plot is the gate drive signal generated at the PWM terminal of controller 7. This figure shows the start-up phase of the supply (to 15 ms), a period of normal running with a nominal load (to 35 ms), and a final period of operating with effectively no load.

During the first first 15 ms, the reservoir capacitor C2 is charged via R1 to Vbulk. As the VCC terminal reaches 14V, the undervoltage lockout turn-on threshold, the control chip is powered up and switching of the PWM signal begins. The auxiliary voltage 10 initially drops, as the current required to run the control circuitry is in excess of that which can be supplied via R1. However, as switching action begins, the charge pump action of the parasitic capacitance C4 of MOSFET 12 and diode D3 provides sufficient current for the circuitry to remain at about 10.5V, which is sufficient to keep the control circuit powered in its operating mode.

At about 35 ms, the load from the power supply is disconnected. As a result, the PWM signal goes not only to a minimum duty cycle, but in order not to raise the load above its desired regulation value, it also cycles, commanding only an occasional pulse. In the presence of a lower effective switching frequency, the charge pump transfers less energy, and as a result the reservoir capacitor C2 is discharged within milliseconds by the supply current of the control circuit 7 to a level of 8V. At that point, the VCC pin of controller 7 falls below its lower undervoltage lockout threshold and the control circuit is shut down. The control circuit now is in a non-operating mode drawing negligible current. This allows reservoir capacitor C2 to again charge via the action of R1 alone. The supply voltage then turns on, but as the unloaded output is still substantially in regulation, the control circuit allows only occasional output pulses. The resulting few pulses are insufficient to drive auxiliary rail 10 via the charge pumping action of C4 and D3. The supply rail 10 therefore discharges and continues a repetitive charging and discharging between the two undervoltage lockout thresholds of control circuit 7.

It should be clear to those skilled in the art that the timing of FIG. 7 has been optimized for illustrating the system operation. A more appropriate selection of component values might be to increase the value of R1 such that the required times to charge reservoir capacitor C2 via R1 are lengthened with respect to the period when C2 is being discharged. The shorter time shown in FIG. 7 is merely to aid in the clarity of the figure and its interpretation.

It is generally understood in the art that low voltage MOSFETs of the type used in integrated circuits can be manufactured with relatively low resistance. It is also possible in this scheme that MOSFET 13 may be made sufficiently low that a resistor, analogous to current sense elements in FIG. 1, may be additionally placed in series with MOSFET 13 to measure current. This would primarily be of benefit in allowing a given integrated circuit implementation of this circuitry to have a maximum current limit that can be reduced by the addition of additional resistance in the current sensing element (e.g. the combination of MOSFET 13 and an external discrete resistor).

Similarly, it is well known in the art that the functions of the control circuit, transistor 13, or their equivalents could alternately be implemented in an integrated circuit. Although descriptions in this specification have assumed the presently near-universal CMOS technology for such implementations, it is understood by those skilled in the art that the general circuit techniques described have applicability in other technologies (e.g. Bipolar, HBT, MESFET) that may be become preferred. Likewise, rather than a MOSFET, transistor 12 could likewise be implemented with an IGBT, another MOS-based structure. Those skilled in the will understand that similar techniques can, with appropriate modifications, also be applied to bipolar transistors. Additionally, although positive supply voltages and N channel silicon devices have been used, it is well known in the art how to instead generate negative output voltages, or to use P-channel devices and a negative bulk voltage.

What is claimed is:

1. A switching power supply comprising:
   an input source of power;
   an output terminal;
   a feedback means providing an output responsive to the voltage at said output terminal of said power supply;
   a coupled inductive element having multiple windings, each with a pair of terminals, a first terminal of a first winding being coupled to said input source of power;
   a first transistor having a drain, a source and a gate, said drain coupled to a second terminal of said first winding of said coupled inductive element;
   a reservoir capacitor coupled to said gate of said first transistor;
   a control circuit being coupled to said reservoir capacitor as a source of power and producing a pulse modulated output in response to said feedback means, said control circuit having an undervoltage lockout function responsive to voltage on said reservoir capacitor with two hysteretic thresholds, a first higher threshold enabling operation of said control circuit when said voltage on said reservoir capacitor exceeds said first threshold, and a second lower threshold which disables said control circuit when said voltage on said reservoir capacitor falls below said second threshold;
   a second transistor with a source, a gate and a drain, said source being coupled to a common node of said input source of power, said drain coupled to said source of said first transistor, and said gate being driven in response to said pulse modulated output of said control circuit;
   a first rectifying means with an anode and a cathode, said anode connected to said drain of said second transistor and said cathode coupled to said reservoir capacitor; and
   an output circuit comprising a second rectifying means with a rectifying input and a rectified output and a filtering means with a filtering input and a filtered output, said second rectifying means having said rectifying input coupled to a second winding of said coupled inductive element and having said rectified output coupled to said filtering input of said filtering means, said filtering means having said filtered output coupled to said output terminal of said switching power supply.

2. The switching power supply of claim 1 wherein said control circuit has a minimum pulse width.

3. The switching power supply of claim 1 wherein said second transistor is alternatively a bipolar transistor with an emitter, a base, and a collector, said emitter being tied to said common node of said input source of power, said collector coupled to said source of said first transistor and to said anode of said first rectifying means, and said base being driven in response to said pulse modulated output of said control circuit.

4. The switching power supply of claim 1 including a third capacitor with two terminals, a first terminal connected to said drain of said first transistor, and a second terminal connected to said source of said first transistor.

5. The switching power supply of claim 1 wherein said control circuit and said second transistor are contained in an integrated circuit.

6. The switching power supply of claim 1 wherein said control circuit, said second transistor and said first rectifying means are contained in an integrated circuit.

7. The switching power supply of claim 1 wherein said output circuit is configured as a flyback output.

8. The switching power supply of claim 1 wherein said output circuit is configured as a forward output.

9. A method for operating a switching power supply, comprising
   switching a first transistor in response to a pulse modulated signal from a control circuit;
   cascoding said first transistor with a second transistor having a gate terminal, a source terminal, and a drain terminal, said second transistor having capacitance between its respective terminals that result in capacitive charge flow during switching, and said second transistor being driven into and out of its conductive state in response to said switching of said first transistor;
   recirculating a first capacitive charge flowing in said gate terminal of said second transistor during switching into a reservoir capacitor connected to said gate of said second transistor, said first capacitive charge flowing into and out of said reservoir capacitor in a substantially equal and opposite manner during turn-off and turn-on of said second transistor;
   capturing a second capacitive charge coupled through said capacitance between said drain terminal and said source terminal of said second transistor following the switching off of said first and second transistors, and storing said second capacitive charge in said reservoir capacitor,
   and utilizing said stored charge in said reservoir capacitor to power said control circuit.

* * * * *